United States Patent
Tinsley et al.

(10) Patent No.: US 11,613,428 B1
(45) Date of Patent: Mar. 28, 2023

(54) LUMBER UNSCRAMBLER AND METHOD OF USING THE UNSCRAMBLER

(71) Applicant: AD Services of Arkansas, Inc., Hot Springs, AR (US)

(72) Inventors: Douglas Monroe Tinsley, Hot Springs, AR (US); James L. Anderson, Florence, SC (US)

(73) Assignee: AD SERVICES OF ARKANSAS, INC., Hot Springs, AR (US)

( * ) Notice: Subject to any disclaimer, the term of this patent is extended or adjusted under 35 U.S.C. 154(b) by 0 days.

(21) Appl. No.: 17/887,683

(22) Filed: Aug. 15, 2022

(51) Int. Cl.
*B65G 47/14* (2006.01)
*B65G 23/06* (2006.01)
*B65G 17/08* (2006.01)

(52) U.S. Cl.
CPC ......... *B65G 47/1471* (2013.01); *B65G 17/08* (2013.01); *B65G 23/06* (2013.01)

(58) Field of Classification Search
CPC ..... B65G 47/1471; B65G 17/08; B65G 23/06

USPC ........................................................ 198/443
See application file for complete search history.

(56) References Cited

U.S. PATENT DOCUMENTS

| | | | |
|---|---|---|---|
| 3,204,753 A | 9/1965 | Moseley | |
| 3,604,563 A * | 9/1971 | Ronan, Jr. ................. | B07C 5/14 414/268 |
| 4,269,303 A | 5/1981 | Cornell | |
| 9,701,485 B2 | 7/2017 | Frechette | |
| 11,097,903 B2 | 8/2021 | Lamb | |
| 2012/0217133 A1 * | 8/2012 | Petryshen .............. | B65G 25/08 198/747 |

FOREIGN PATENT DOCUMENTS

DE 102007006287 A1 * 8/2008 ........... B27B 31/006

\* cited by examiner

*Primary Examiner* — Gene O Crawford
*Assistant Examiner* — Lester Rushin, III
(74) *Attorney, Agent, or Firm* — Jeffrey S. Melcher; Melcher Patent Law PLLC

(57) ABSTRACT

An adjustable pitch unscrambler that can adjust the pitch to accommodate boards having different widths, and method of using the adjustable pitch unscrambler to singulate boards in a lumber processing facility.

27 Claims, 15 Drawing Sheets

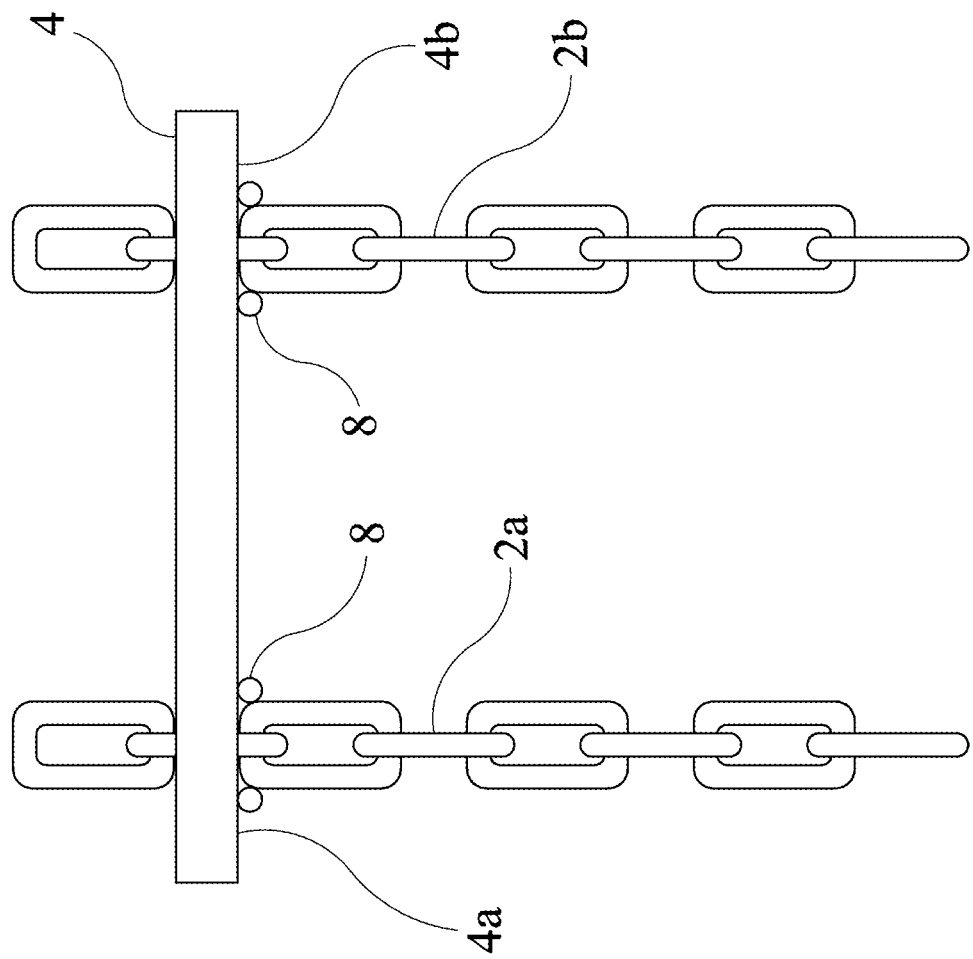
FIG. 1C [PRIOR ART]

LUMBER UNSCRAMBLER AND METHOD OF USING THE UNSCRAMBLER

FIELD OF THE INVENTION

The present invention relates to adjustable pitch unscrambler that can vary the pitch of the lugs to accommodate different board widths, and use of the adjustable pitch unscrambler to singulate boards.

BACKGROUND OF THE INVENTION

In the lumber manufacturing industry, between manufacturing processes in both the sawmill (which cuts the raw lumber of various sizes out of round logs) and the planer mill (which planes the sorted and dried lumber into a consistent size), a device called an unscrambler (or alternatively descrambler) is used to singulate the lumber after it has been deep piled. One application in a sawmill would be before the trimming operation where the wood manufactured through all the other various machine centers gets piled on a transfer deck, then the pile of lumber must be "unscrambled" and singulated so that each board can be trimmed to the proper length. In a planer mill, one application would be where all the lumber has been trimmed and sorted by grade and length to create bundles, and these bundles of lumber now need to be "unscrambled" so they can be stacked in layers to make a neat package. In a planer mill, all of the boards typically have the same width and thickness.

Unscramblers come in a variety of configurations, but the most popular and currently the most efficient is called a bar lug unscrambler where a pair of chains are tied together by a series of evenly spaced bar lugs on a specific integral number of chain links. The distance between bar lugs is referred to as the "pitch" of the bar lugs. Bar lugs welded on chain every 8 links of the chain would be referred to as bar lugs on "8 pitch centers". During use, a single board drops into the "slot" of space between the bar lugs. However, this does not always turn out that way because the slots between the bar lugs is typically sufficiently wide to accommodate the widest lumber piece fed to the unscrambler. Thus, if there are 2 inch thick×12 inch wide boards that must be fed to the unscrambler, typical slots based on 8 pitch centers are far too wide, too great of a pitch, for 1 inch thick×4 inch wide boards so that more than one 1 inch thick×4 inch width boards can fall into the slot between adjacent bar lugs, which requires that the boards must be otherwise separated in an additional process.

U.S. Pat. No. 3,204,753 (Mosely); U.S. Pat. No. 4,269,303 (Cornell); U.S. Pat. No. 9,701,485 (Frechette); and 11,097,903 (Lamb), disclose conventional board unscramblers similar to the type shown in FIGS. 1A-1C [Prior Art]. The complete disclosure of these patents are incorporated herein by reference. The bar lugs 4 are mounted on pairs of chains 2 by welding 8 a first end 4a of the bar lug 2 to a chain link on a first chain 2a and welding 8 a second end 4b of the bar lug 2 to a chain link on a second chain 2b. The distance between the bar lugs 2 is a fixed pitch 40. The chains 2 are driven by a sprocket 6 connected a motor 20. Lumber 3 is fed to the bottom of the unscrambler and the lumber 3 falls into slots between the bar lugs 4 and carried up the unscrambler. Since the pitch 40 is fixed, when small lumber 3 is being unscrambled more than one piece of lumber 3 can fall into the slot as shown in FIG. 1B [Prior Art]. The present invention solves this problem.

There is a need to provide an improved unscrambler (descrambler) that can more efficiently and effectively handle boards having varying widths.

SUMMARY OF THE INVENTION

An objective of the invention is to provide an improved unscrambler (descrambler) that can be adjusted to adjust lug pitch according to the width of the boards being handled.

In a sawmill the lumber pieces vary widely in width and it will be difficult to adjust the pitch to handle a 2 inch thick×4 inch wide board because the next board might be a 2 inch thick×12 inch wide board and both boards need to go up the unscrambler one right after the other. Thus, the present invention is more suitable for use in a planer mill or other facility where large volumes of lumber being batch processed are the same width and thickness so the pitch can first be easily adjusted to the desired width with a button or other input method depending on the product being processed.

The objectives of the invention and other objectives can be obtained by an adjustable pitch lumber unscrambler comprising:

a first plurality of first chain pairs, each of the first chain pairs comprising a pair of parallel, continuous chains, a first plurality of first bar lugs mounted between the first chain pairs, a distance between the first bar lugs is a first fixed pitch, and the first bar lugs on different first chain pairs line up to each other;

a second plurality of second chain pairs, each of the second chain pairs comprising a pair of parallel, continuous chains, a second plurality of second bar lugs mounted between the second chain pairs, a distance between the second bar lugs is a second fixed pitch, and the second bar lugs on different second chain pairs line up with each other;

the first chain pairs and the second chain pairs being inter dispersed;

at least one motor connected to a plurality of first sprockets driving the plurality of first chain pairs and connected to a plurality of second sprockets driving the plurality of second chain pairs so that the plurality of first sprockets can be driven independently of the plurality of second sprockets;

a programmable controller configured to control the at least one motor to provide an adjustable pitch between the first bar lugs and the second bar lugs;

a first lug location device in communication with the programmable controller configured to determine the location of the first bar lugs during use; and a second lug location device in communication with the programmable controller configured to determine the location of the second bar lugs during use.

The objectives of the invention and other objectives can be obtained by a method of unscrambling lumber comprising:

providing an adjustable pitch lumber unscrambler comprising:

a first plurality of first chain pairs, each of the first chain pairs comprising a pair of parallel, continuous chains, a first plurality of first bar lugs mounted between the first chain pairs, a distance between the first bar lugs is a first fixed pitch, and the first bar lugs on different first chain pairs line up to each other;

a second plurality of second chain pairs, each of the second chain pairs comprising a pair of parallel, continuous chains, a second plurality of second bar lugs mounted between the second chain pairs, a distance between the second bar lugs is a second fixed pitch, and the second bar lugs on different second chain pairs line up with each other;

the first chain pairs and the second chain pairs being inter dispersed;

at least one motor connected to a plurality of first sprockets driving the plurality of first chain pairs and connected to a plurality of second sprockets driving the plurality of second chain pairs so that the plurality of first sprockets can be driven independently of the plurality of second sprockets;

a programmable controller configured to control the at least one motor to provide an adjustable pitch between the first bar lugs and the second bar lugs;

a first lug location device in communication with the programmable controller configured to determine the location of the first bar lugs during use; and a second lug location device in communication with the programmable controller configured to determine the location of the second bar lugs during use;

adjusting the adjustable pitch by moving the plurality of first chain pairs in relation to the second chain pairs to form slots between adjacent first and second bar lugs, the slot being sized to receive only one piece of lumber;

feeding the lumber to a bottom of the unscrambler; and moving the plurality of first chain pairs and plurality of second bar lug chains in unison by the at least one motor so that a single piece of lumber falls in each slot and the lumber is carried up to a top of the unscrambler by the moving first chain pairs and plurality of second bar lug chains.

The objectives of the invention can be further obtained by an adjustable pitch lumber unscrambler comprising:

a first plurality of first chain pairs, each of the first chain pairs comprising a pair of parallel, continuous chains, a first plurality of first lugs mounted on the first chain pairs, a distance between the first lugs is a first fixed pitch, and the first lugs on different first chain pairs line up to each other;

a second plurality of second chain pairs, each of the second chain pairs comprising a pair of parallel, continuous chains, a second plurality of second lugs mounted on the second chain pairs, a distance between the second lugs is a second fixed pitch, and the second lugs on different second chain pairs line up with each other;

the first chain pairs and the second chain pairs being inter dispersed;

at least one motor connected to a plurality of first sprockets driving the plurality of first chain pairs and connected to a plurality of second sprockets driving the plurality of second chain pairs so that the plurality of first sprockets can be driven independently of the plurality of second sprockets;

a programmable controller configured to control the at least one motor to provide an adjustable pitch between the first lugs and the second lugs;

a first lug location device in communication with the programmable controller configured to determine the location of the first lugs during use; and a second lug location device in communication with the programmable controller configured to determine the location of the second lugs during use.

The objectives of the invention can further be obtained by a method of unscrambling lumber comprising:

providing an adjustable pitch lumber unscrambler comprising:

a first plurality of first lug chain pairs, each of the first lug chain pairs comprising a pair of parallel, continuous chains, a first plurality of first lugs mounted on the chain pairs, a distance between the first lugs is a first fixed pitch, and the first lugs on different first lug chain pairs line up to each other;

a second plurality of second lug chain pairs, each of the second lug chain pairs comprising a pair of parallel, continuous chains, a second plurality of second lugs mounted on the chain pairs, a distance between the second lugs is a second fixed pitch, and the second lugs on different second lug chain pairs line up with each other;

the first lug chain pairs and the second lug chain pairs being inter dispersed;

at least one motor connected to a plurality of first sprockets driving the plurality of first chain pairs and connected to a plurality of second sprockets driving the plurality of second chain pairs so that the plurality of first sprockets can be driven independently of the plurality of second sprockets;

a programmable controller configured to control the at least one motor to provide an adjustable pitch between the first lugs and the second lugs;

a first lug location device in communication with the programmable controller configured to determine the location of the first lugs during use; and a second lug location device in communication with the programmable controller configured to determine the location of the second lugs during use;

adjusting the adjustable pitch by moving the plurality of first lug chain pairs in relation to the second lug chain pairs to form slots between adjacent first and second lugs, the slot being sized to receive only one piece of lumber;

feeding the lumber to a bottom of the unscrambler; and moving the plurality of first lug chain pairs and plurality of second lug chains in unison by the at least one motor so that a single piece of lumber falls in each slot and the lumber is carried up to a top of the unscrambler by the moving first lug chain pairs and plurality of second lug chains.

BRIEF DESCRIPTION OF THE DRAWINGS

The operation and advantages of the present invention will become apparent as consideration is given to the following detailed description in conjunction with the accompanying drawings, in which:

FIG. 1C [Prior Art] is a view of a pair of chains with a bar lug welded to a link of each chain.

DETAILED DESCRIPTION OF THE INVENTION

In the following detailed description, reference may be made to the accompanying drawings which form a part hereof, and in which is shown by way of illustration embodiments in which the invention may be practiced. It is to be understood that other embodiments may be utilized and structural or logical changes may be made without departing from the scope of the present invention. Therefore, the following detailed description is not to be taken in a limiting sense, and the scope of embodiments in accordance with the present invention is defined by the appended claims and their equivalents.

Figure 1A:
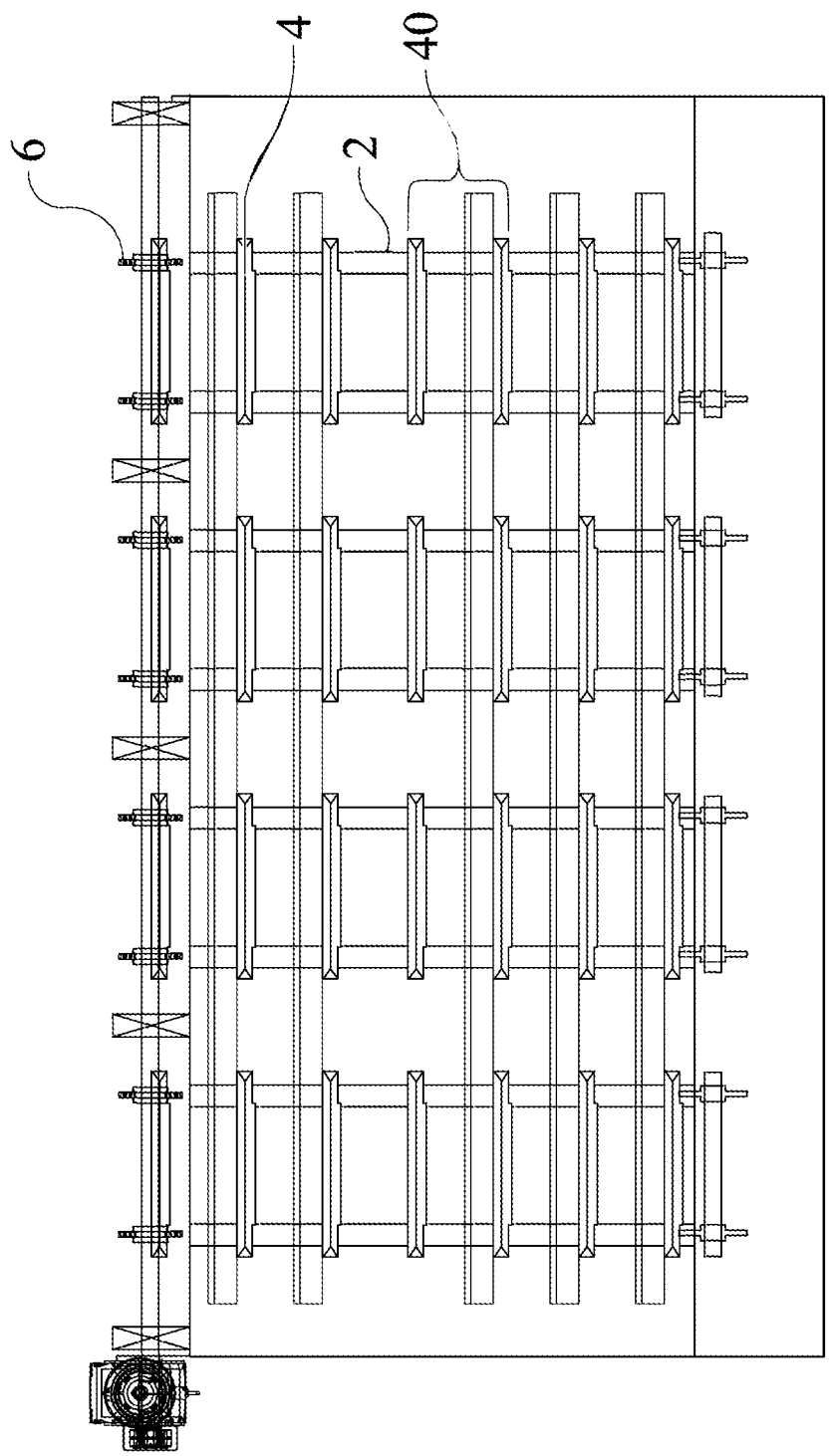
FIG. 1A [Prior Art] is plane view of a fixed pitch unscrambler.
Figure 1B:
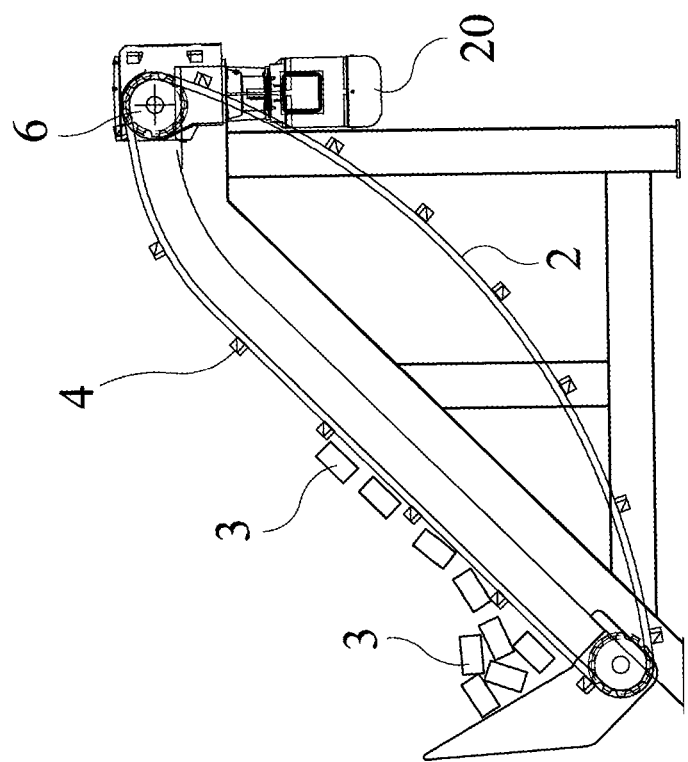
FIG. 1B [Prior Art] is a side view of a fixed pitch unscrambler.

Fixed-pitch unscramblers, such as shown in FIGS. 1A-1C [Prior Art] and described in the background section herein, are now well-known in the art. Any suitable unscrambler can be modified according to the present invention to provide an adjustable pitch unscrambler by incorporating a second set of chain pairs operated independently of the first set of chain pairs as disclosed herein.

FIGS. 2A-3B show an unscrambler of FIGS. 1A-1C modified according to the present invention to include a second set of chain pairs driven by a separate motor. The modified unscrambler 1 includes a plurality of first chain pairs 14 and a plurality of second chain pairs 15, which are preferably inter dispersed as shown. The first chain pair 14 has first bar lugs 16 mounted on the chains 2. The second chain pair 15 has second bar lugs 17 mounted on the chains 2. Preferably, the first fixed pitch 41 between the first bar lugs 16 and the second fixed pitch 42 between the second bar lugs 17 are the same. The first bar lugs 16 on different first chain pairs 14 line up to each other. The second bar lugs 17 on different first chain pairs 15 line up to each other.

The plurality of first chain pairs 14 are driven by a first motor 21 connected to a plurality of first sprockets 18 in a conventional manner. The plurality of second chain pairs 15 are drive by a second motor 22 connected to a plurality of second sprockets 19 in a conventional manner.

To properly operate the improved unscrambler 1, a programmable controller (PLC) 60 is used to control the first motor 21 and the second motor 22 independently of each other. PLC's 60 are now well-known and any suitable PLC 60 can be utilized to operate the unscrambler 1. Examples of suitable commercial PLC's 60 are sold by Allen-Bradley.

The PLC 60 must know the location of the first bar lugs 16 and location of the second bar lugs 17 during use. Location devices are now well-known and any suitable location device can be utilized, such as encoders 50. FIGS. 2A-3B show a first lug location device 48 for determining the location of the first bar lugs 16 and a second lug location device 49 for determining the location of the second bar lugs 17. Examples of suitable commercial encoders 50 are incremental optical encoders sold by Allen-Bradley.

Figure 2A:
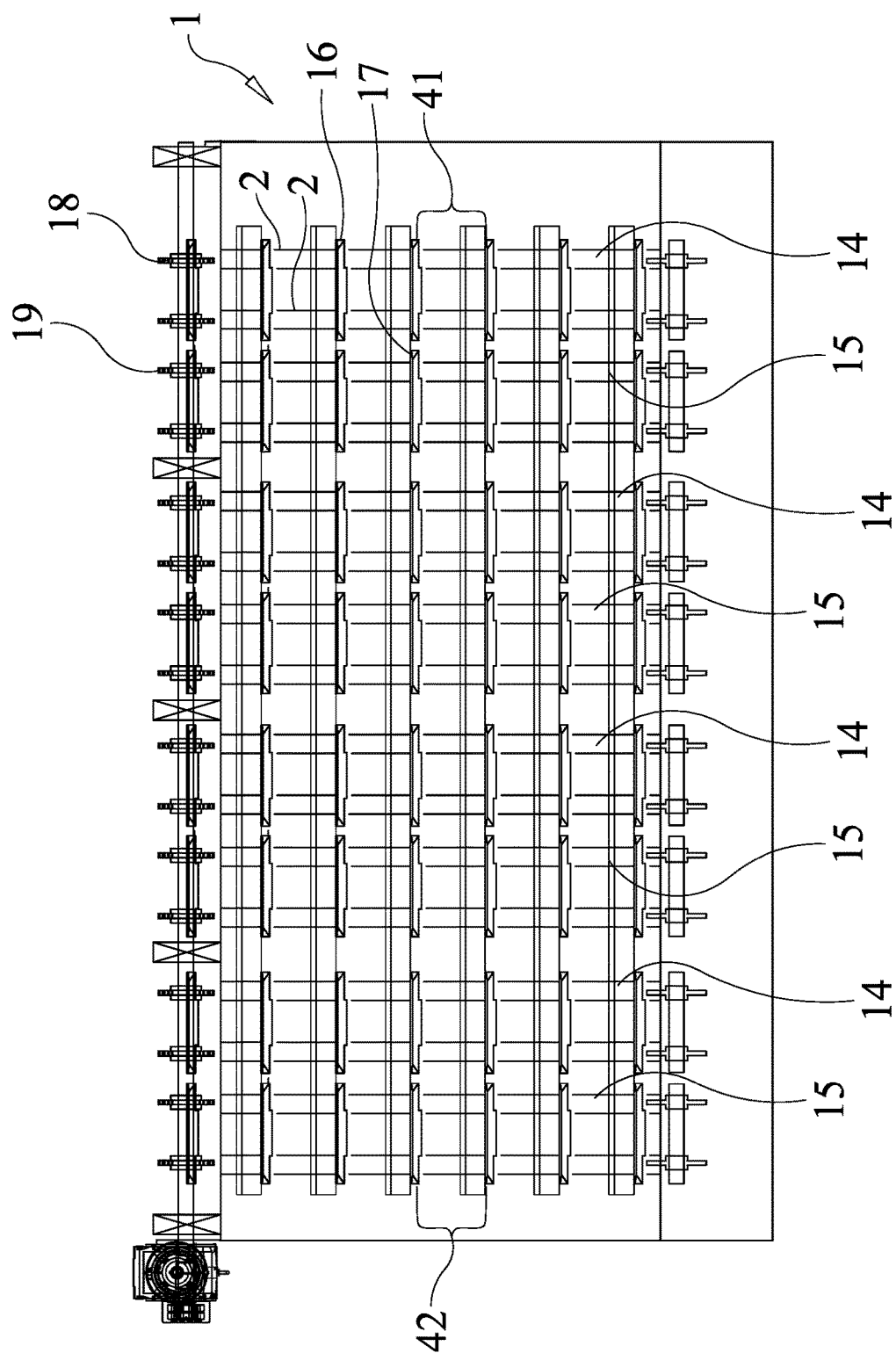
FIG. 2A is plane view of an adjustable pitch unscramber in phase.
Figure 2B:
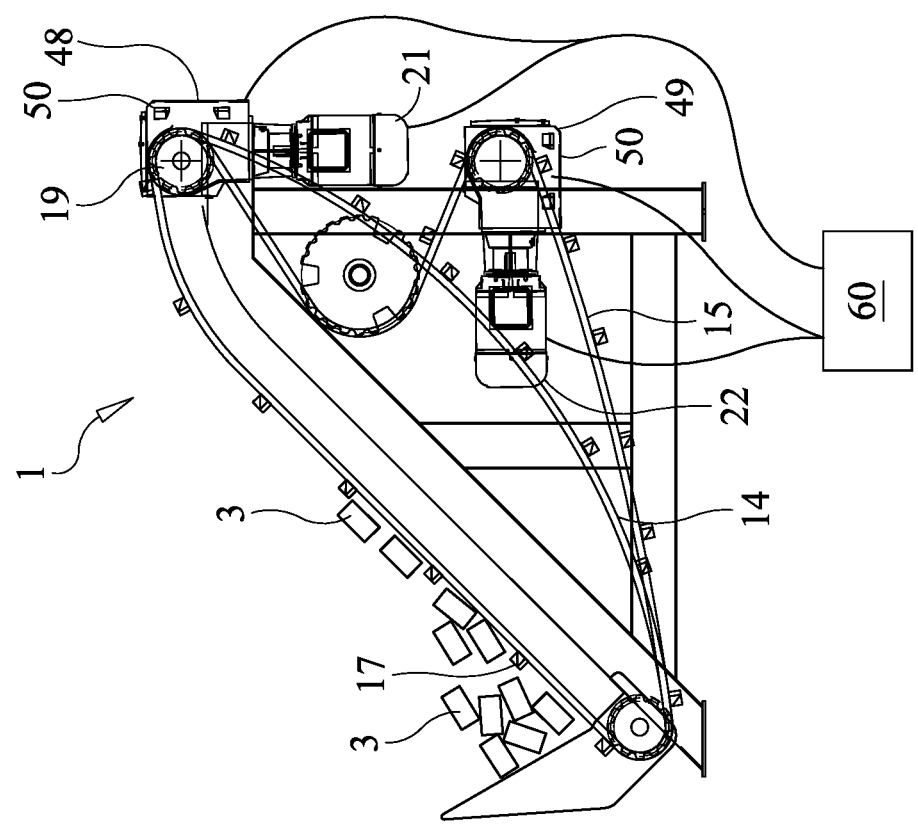
FIG. 2B is a side view of an adjustable pitch unscrambler in phase.
Figure 3A:
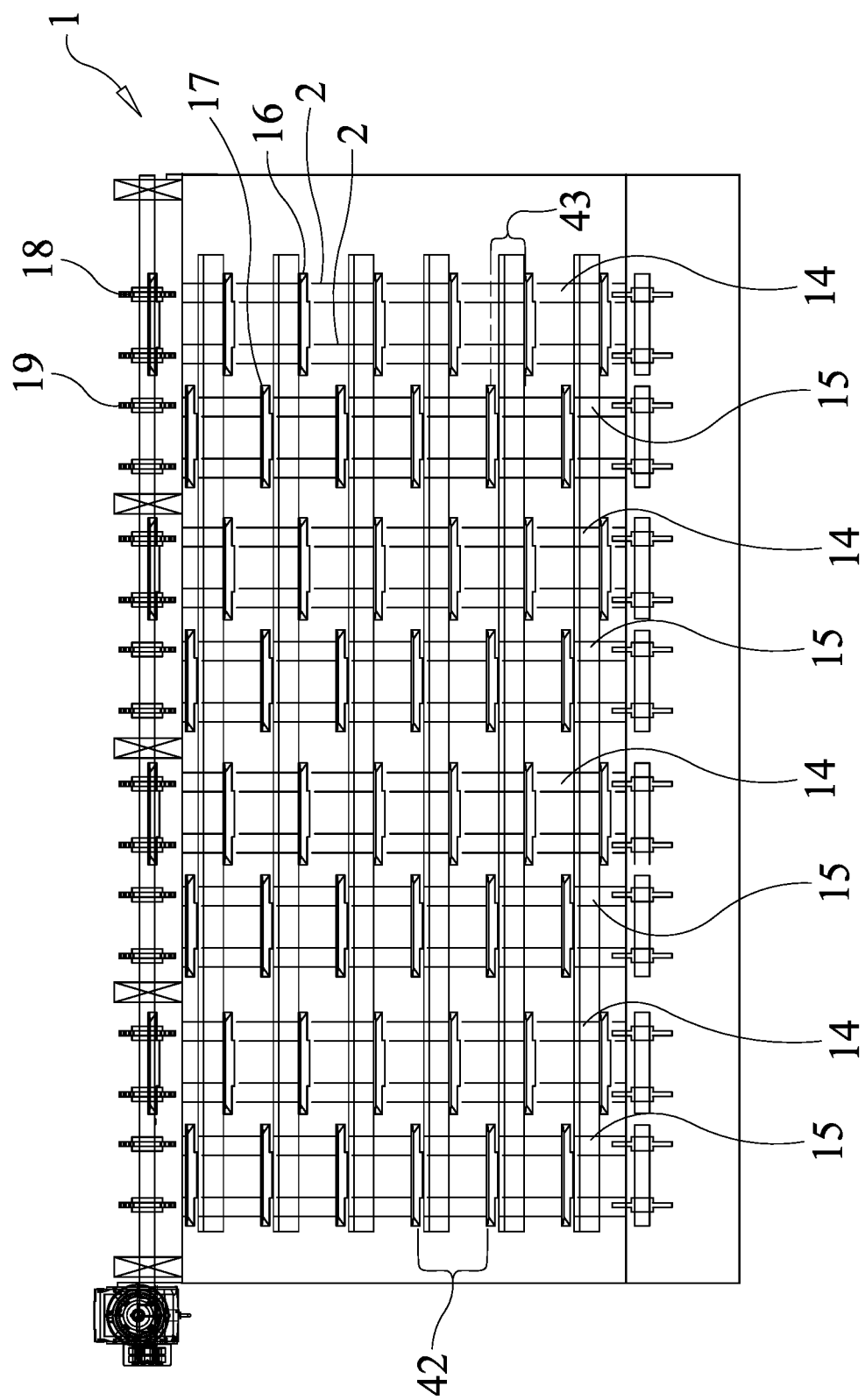
FIG. 3A is a plane view of an adjustable pitch unscrambler out of phase.
Figure 3B:
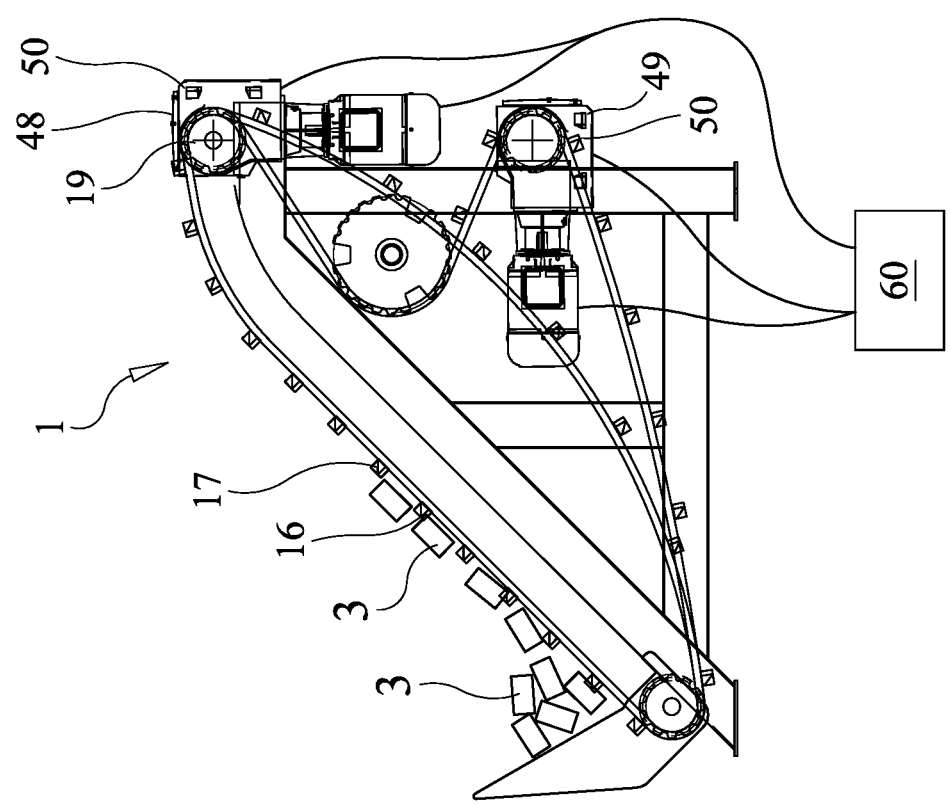
FIG. 3B is a side view of an adjustable pitch unscrambler out of phase.

The PLC 60 is connected to the first and second lug location devices 48, 49. While an encoder 50 is used as an example of the first and second lug location devices 48, 49, other types of known lug location devices can be utilized. Each motor 21, 22 has an associated encoder 50 so that the location of the first bar lugs 16 and the location of the second bar lugs 17 is known. The first motor 21 and the second motor 22 can be independently operated by the PLC 60 to provide a desired adjustable pitch 43 between the first bar lugs 16 and the second bar lugs 17. When the first fixed pitch 41 and the second fixed pitch 42 are the same, the adjustable pitch 43 will have a maximum equal to the fixed pitch 41 when the first bar lugs 16 and the second bar lugs 17 are in phase (on the same plane) as shown in FIGS. 2A and 2B, and when the first bar lugs 16 and the second bar lugs 17 are out of phase as show in FIGS. 3A-3B the adjustable pitch 43 can be adjusted down a minimum of about half of the fixed pitch 41 minus a thickness of the bar lug 16.

The present invention includes a method of using the improved unscrambler 1 to unscramble a pile of lumber 3 fed to the unscrambler 1. The PLC 60 is used to first adjust the adjustable pitch 43 so that only one of the boards of lumber 3 will fit in the slot between the first bar lugs 16 and the second bar lugs 17. The PLC 60 can adjust the adjustable pitch 43 by moving the first bar lugs 16 in relation to the second bar lugs 17. Once the desired adjustable pitch 43 is achieved, the unscrambler 1 can be operated by moving both the plurality of first chain pairs 14 and the plurality of second chain pairs 15 in unison to retain the adjustable pitch 43. During operation, lumber 3 is fed to a bottom of the unscrambler 1 and single pieces of lumber 3 falls into each slot between adjacent first bar lugs 16 and second bar lugs 17 and travel up the unscrambler. In this manner, the lumber 3 is unscrambled and separated into single boards travelling on conveyor to be further treated in the planer mill or stacked.

The improved scrambler 1 solves the problem of more than one piece of lumber 3 falling into the slots between adjacent bar lugs and significantly enhances the singulating and delivery of lumber 3 through the planer mill.

Single Lug Unscrambler Embodiment

As shown in FIGS. 4A-5B, in an alternative embodiment of the unscrambler 1 the lug bars 16 and 17 which are mounted to respective chain pairs 14 and 15 are replaced with separate lugs, first lugs 116 mounted on the first chain pairs 14 and second lugs 117 mounted on the chain pairs 15. Since the first lugs 116 and second lugs 117 are on single chains 2, the chain pairs 14 and 15 can be replaced with single chains 2 or more than pairs of chains 2. The first bar lugs 16 on different first chain pairs 14 line up to each other. The second bar lugs 17 on different second chain pairs 15 line up to each other.

Preferably, the first fixed pitch 41 between the first lugs 116 and the second fixed pitch 42 between the second lugs 117 are the same.

The plurality of first chain pairs 14 are driven by a first motor 21 connected to a plurality of first sprockets 18 in a conventional manner. The plurality of second chain pairs 15 are drive by a second motor 22 connected to a plurality of second sprockets 19 in a conventional manner.

To properly operate the improved unscrambler 1, a programmable controller (PLC) 60 is used to control the first motor 21 and the second motor 22 independently of each other. PLC's 60 are now well-known and any suitable PLC 60 can be utilized to operate the unscrambler 1.

The PLC 60 must know the location of the first lugs 116 and location of the second lugs 117 during use. FIGS. 4A-5B show the first lug location device 48 now being used for determining the location of the first lugs 116 and the second lug location device 49 now being used for determining the location of the second lugs 117.

Figure 4A:
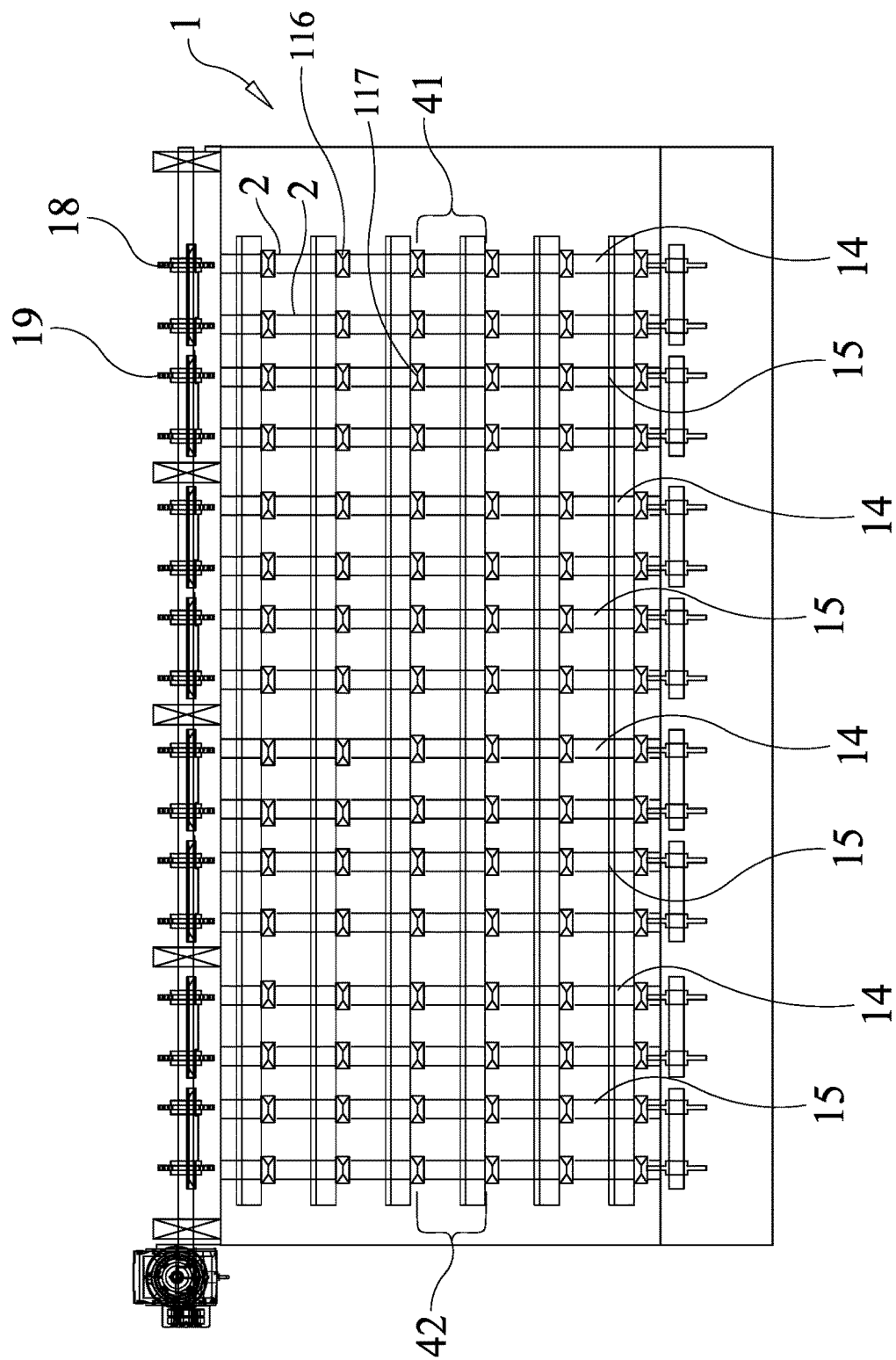
FIG. 4A is a plane view of an alternative embodiment of the adjustable pitch unscrambler in phase.
Figure 4B:
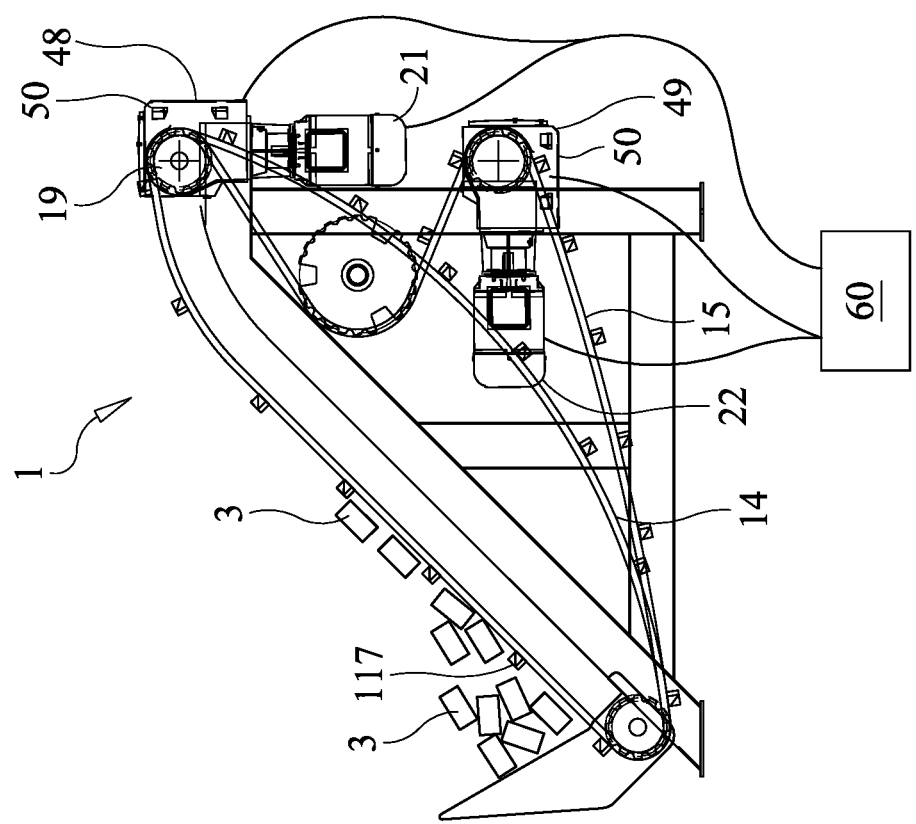
FIG. 4B is a side view of an alternative embodiment of the adjustable pitch unscrambler in phase.
Figure 5A:
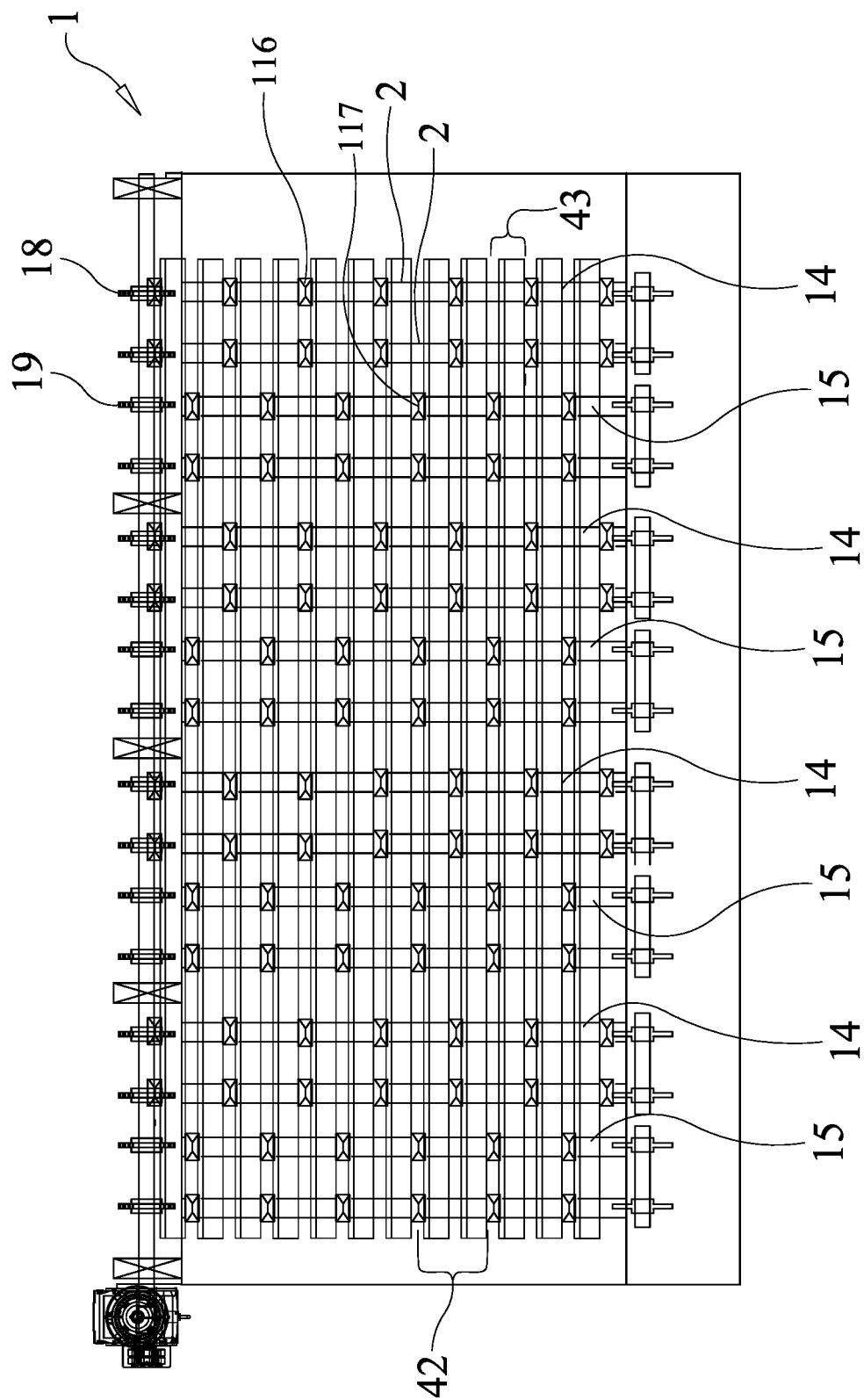
FIG. 5A is a plane view of an alternative embodiment of the adjustable pitch unscrambler out of phase.
Figure 5B:
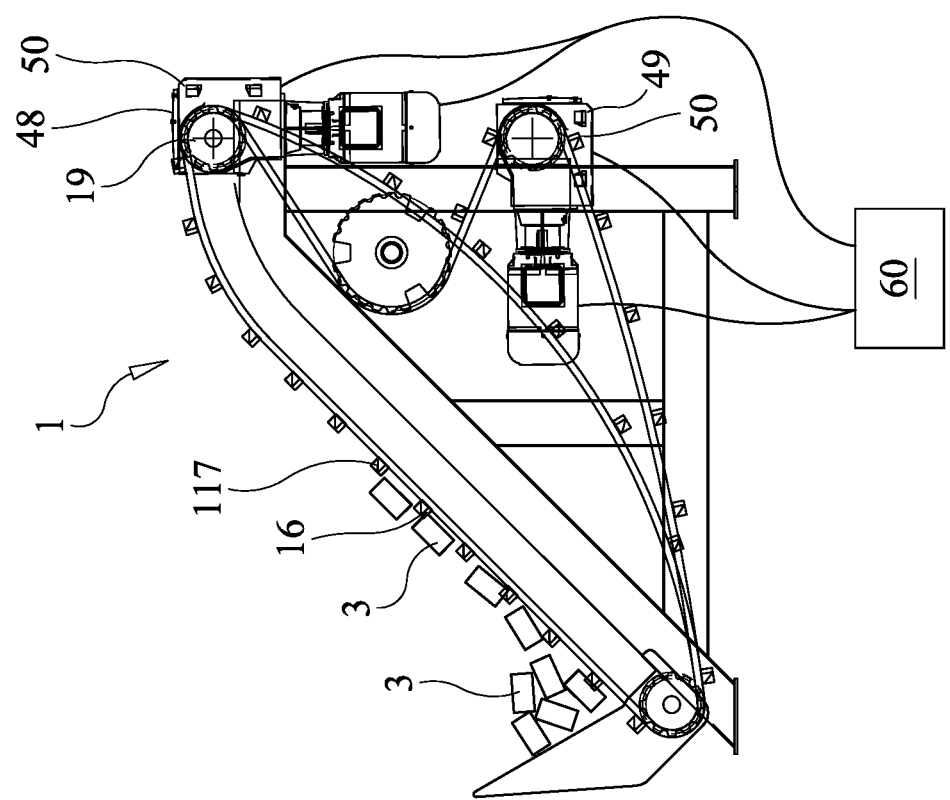
FIG. 5B is a side view of an alternative embodiment of the adjustable pitch unscrambler out of phase.

The PLC 60 is connected to the first and second lug location devices 48, 49. Each motor 21, 22 has an associated encoder 50 so that the location of the first lugs 116 and the location of the second lugs 117 is known. The first motor 21 and the second motor 22 can be independently operated by the PLC 60 to provide a desired adjustable pitch 43 between the first lugs 116 and the second lugs 117. When the first fixed pitch 41 and the second fixed pitch 42 are the same, the adjustable pitch 43 will have a maximum equal to the fixed pitch 41 when the first lugs 116 and the second lugs 117 are in phase (on the same plane) as shown in FIGS. 4A and 4B, and when the first lugs 116 and the second lugs 117 are out of phase as show in FIGS. 5A-5B the adjustable pitch 43 can be adjusted down a minimum of about half of the fixed pitch 41 minus a thickness of the lug 116.

The present invention includes a method of using the improved unscrambler 1 to unscramble a pile of lumber 3 fed to the unscrambler 1. The PLC 60 is used to first adjust the adjustable pitch 43 so that only one of the boards of lumber 3 will fit in the slot between the first lugs 116 and the second lugs 117. The PLC 60 can adjust the adjustable pitch 43 by moving the first lugs 116 in relation to the second lugs 117. Once the desired adjustable pitch 43 is achieved, the unscrambler 1 can be operated by moving both the plurality of first chain pairs 14 and the plurality of second chain pairs 15 in unison to retain the adjustable pitch 43. During operation, lumber 3 is fed to a bottom of the unscrambler 1 and single pieces of lumber 3 falls into each slot between adjacent first lugs 116 and second lugs 117 and travel up the unscrambler. In this manner, the lumber 3 is unscrambled and separated into single boards travelling on conveyor to be further treated in the planer mill or stacked.

Clutched Unscrambler Embodiment

FIGS. 6A-7B illustrate a clutched embodiment of the unscrambler 1 which can use a single motor 20 having a clutch 80 to provide adjustable pitch. The unscrambler 1 includes a plurality of first chain pairs 14 and a plurality of second chain pairs 15, which are preferably inter dispersed as shown. The first chain pair 14 has first bar lugs 16 mounted on the chains 2. The second chain pair 15 has second bar lugs 17 mounted on the chains 2. Preferably, the first fixed pitch 41 between the first bar lugs 16 and the second fixed pitch 42 between the second bar lugs 17 are the same. The first bar lugs 16 on different first chain pairs 14 line up to each other. The second bar lugs 17 on different first chain pairs 15 line up to each other.

The plurality of first chain pairs 14 are driven by the motor 20 connected to a plurality of first sprockets 18 in a conventional manner. The plurality of second chain pairs 15 are drive by the motor 20 connected to a plurality of second sprockets 19 via a clutch 80.

The clutch 80 is switchable between engaging the sprockets 19 with the motor 20 and disengaging the sprockets 19 with the motor 20. When the clutch 80 engages the sprockets 19, all of the sprockets 19 and 18 are driven in unison by the motor 20. When the clutch 80 disengages the sprockets 19, the sprockets 18 are driven by the motor 20 independently of the sprockets 18 so that the adjustable pitch 43 can be adjusted as desired.

Since both the first bar lugs 16 and second bar lugs 17 are driven by the same motor, the PLC 60 does not need to know the location of the first bar lugs 16 and location of the second bar lugs 17 during use. Thus, no lug location devices are required to operate this embodiment. The adjustable pitch 43 can be manually set by the user, in which case no lug location devices are required.

However, for the PLC 60 to be able to accurately adjust the adjustable pitch 43, the PLC 60 needs to know the location of the first bar lugs 16 and location of the second bar lugs 17 during. FIGS. 6A-7B show a first lug location device 48 for determining the location of the first bar lugs 16 and a second lug location device 49 for determining the location of the second bar lugs 17. The PLC 60 is connected to the first and second lug location devices 48, 49 and the clutch 80.

Figure 6A:
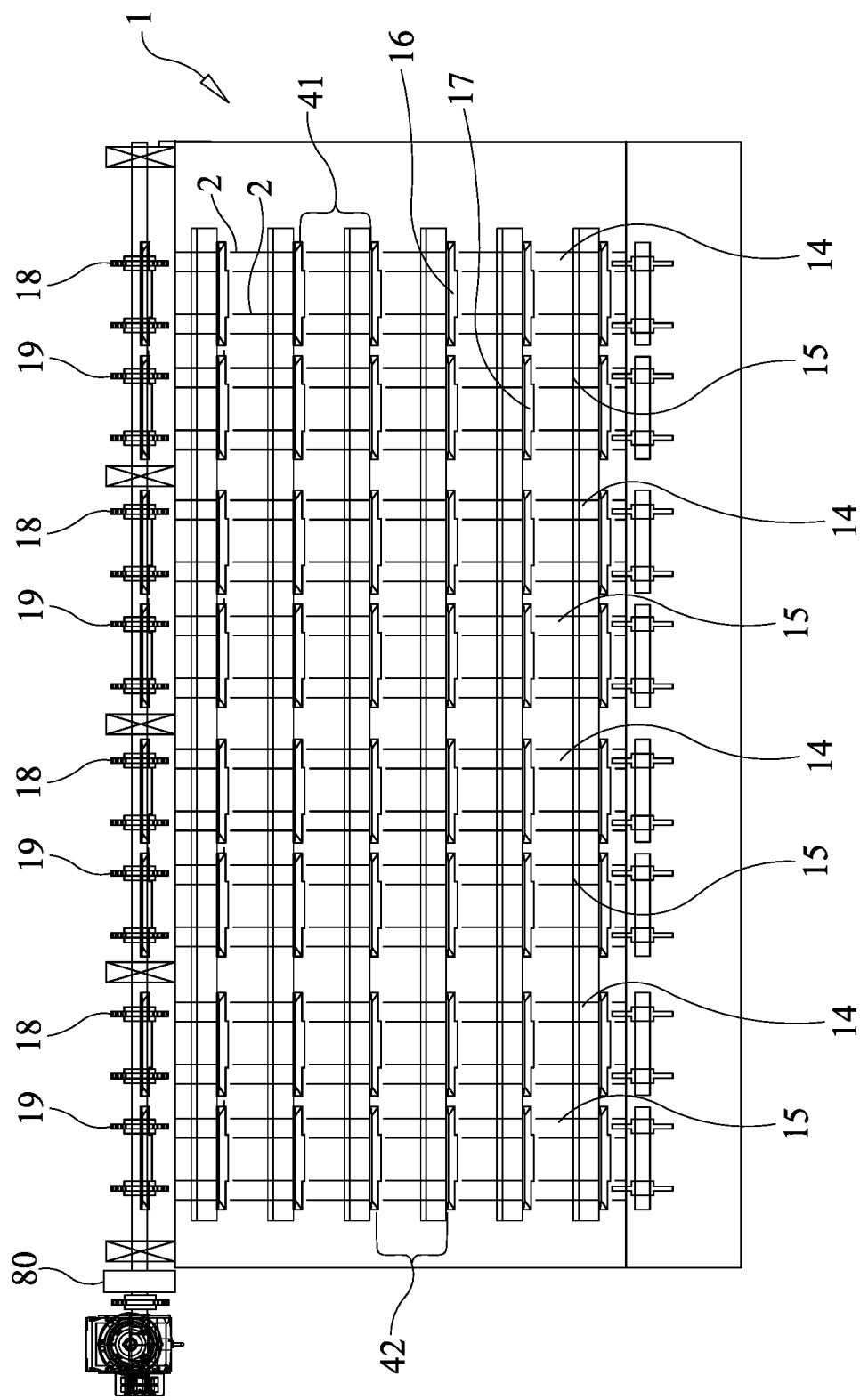
FIG. 6A is a plane view of a single motor embodiment of the adjustable pitch unscrambler in phase.
Figure 6B:
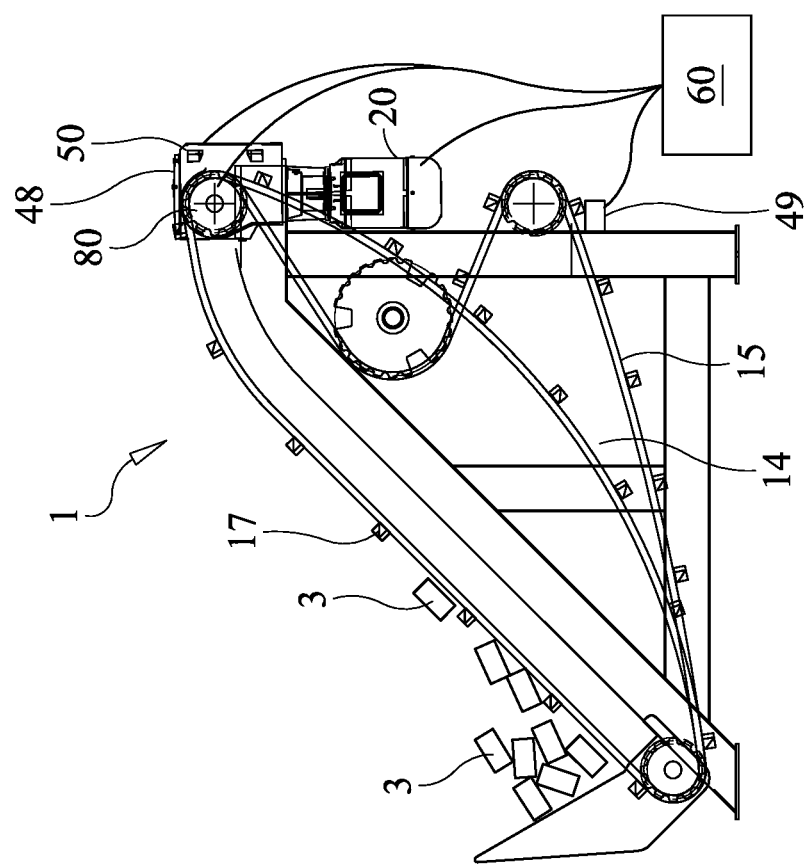
FIG. 6B is a side view of an alternative embodiment of the adjustable pitch unscrambler in phase.
Figure 7A:
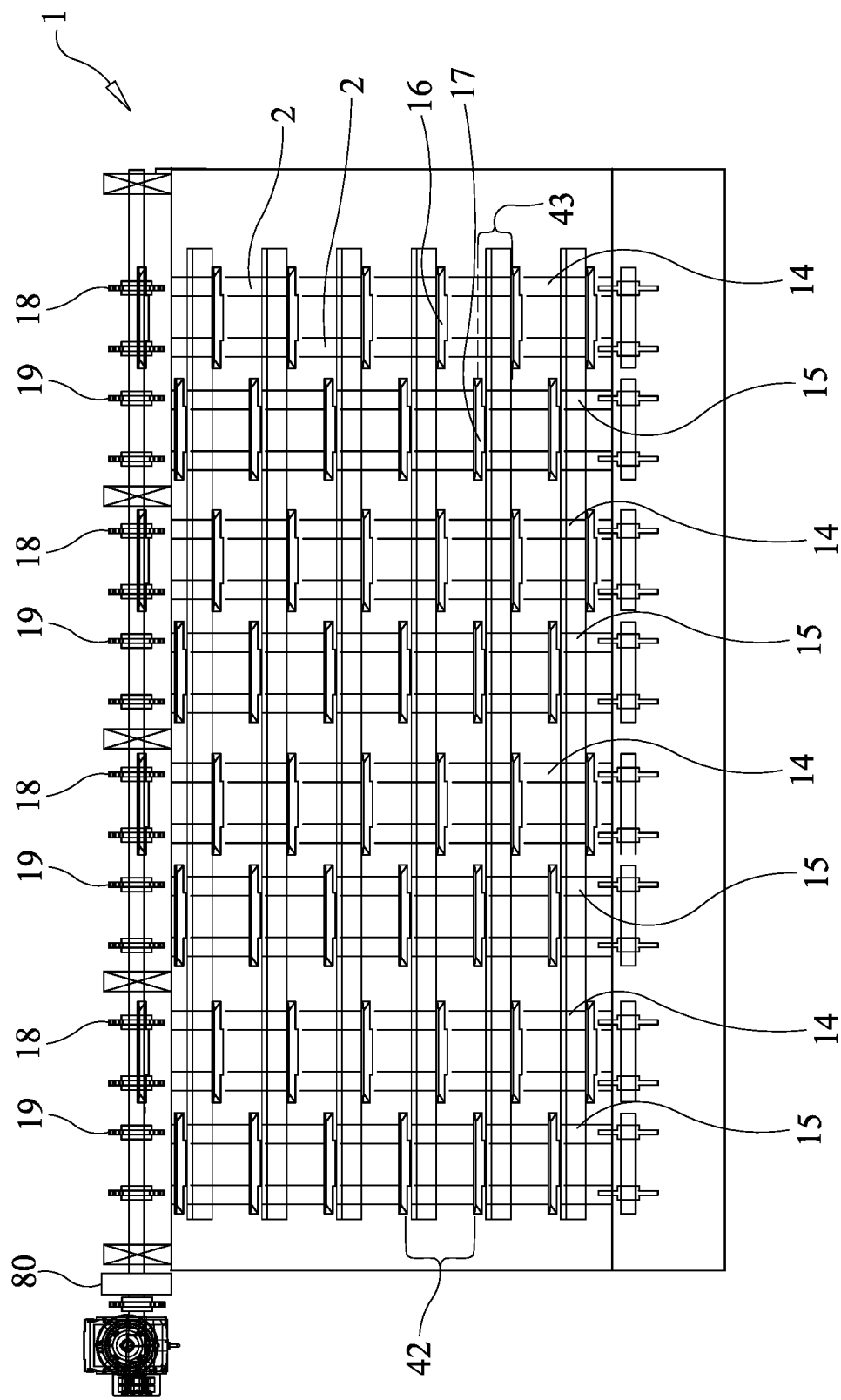
FIG. 7A is a plane view of a single motor alternative embodiment of the adjustable pitch unscrambler out of phase.
Figure 7B:
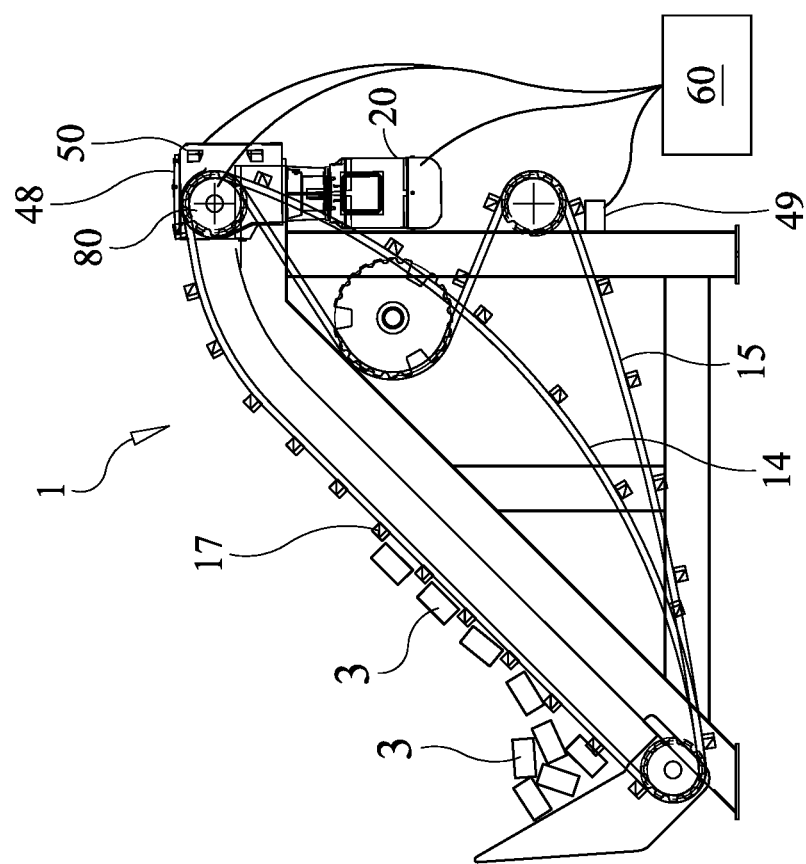
FIG. 7B is a side view of a single alternative embodiment of the adjustable pitch unscrambler out of phase.

When the first fixed pitch 41 and the second fixed pitch 42 are the same, the adjustable pitch 43 will have a maximum equal to the fixed pitch 41 when the first bar lugs 16 and the second bar lugs 17 are in phase (on the same plane) as shown in FIGS. 6A and 6B, and when the first bar lugs 16 and the second bar lugs 17 are out of phase as show in FIGS. 7A-7B the adjustable pitch 43 can be adjusted down a minimum of about half of the fixed pitch 41 minus a thickness of the bar lug 16.

The present invention includes a method of using the improved unscrambler 1 to unscramble a pile of lumber 3 fed to the unscrambler 1. The PLC 60 is used to first adjust the adjustable pitch 43 so that only one of the boards of lumber 3 will fit in the slot between the first bar lugs 16 and the second bar lugs 17. The PLC 60 can adjust the adjustable pitch 43 first disengaging the clutch 80 and then moving the first bar lugs 16 in relation to the second bar lugs 17 by using the motor 20 to drive the sprockets 18 while the disengaged sprockets 19 remain stationary. Once the desired adjustable pitch 43 is achieved, the PLC 80 engages the clutch 80 so that the sprockets 18 and 19 are driven in unison by the motor 20. During operation, lumber 3 is fed to a bottom of the unscrambler 1 and single pieces of lumber 3 falls into each slot between adjacent first bar lugs 16 and second bar lugs 17 and travel up the unscrambler. In this manner, the lumber 3 is unscrambled and separated into single boards travelling on conveyor to be further treated in the planer mill or stacked.

Retro Fitting Conventional Unscramblers.

Conventional unscramblers in use can be easily retrofitted by incorporating a second motor and/or clutch as described herein to provide an adjustable pitch and solve the problem of more than one board falling in a slot between adjacent lugs.

REFERENCE NOS

1 Unscrambler
2 Chain
3 Lumber
4 Bar lug
4a First side of bar lug
4b Second side of bar lug
6 Sprocket
8 Weld
14 First chain pairs
15 Second chain pairs
16 First bar lug mounted on first chain pairs 14

17 Second bar lug mounted on second chain pairs 15
18 First sprocket
19 Second sprocket
20 Motor driving lug chain pairs
21 First motor driving the first chain pairs
22 Second motor driving the second chain pairs
40 Fixed pitch (the distance between adjacent first bar lugs)
41 First fixed pitch of first bar lugs 16
42 Second fixed pitch of second bar lugs 17
43 Adjustable pitch (the distance between a first bar lug 16 and a second bar lug 17)
44 First alternative fixed pitch of first lugs 116
45 Second alternative fixed pitch of second lugs 117
46 Adjustable alternative pitch (the distance between a first lug 116 and a second lug 117)
48 First lug location device
49 Second lug location device
50 Encoder
60 Programmable Controller (PLC)
80 Clutch
116 First lugs mounted on first chain pairs 14
117 Second lugs mounted on second chain pairs 15

While bar lugs welded to chains have been shown as the preferred method, other means of mounting the bar lugs can be utilized, such as using fasteners to fasten the lugs to the chains, or fastening the bar lugs to cables.

In addition to the discussion of various embodiments above, figures and additional discussion are presented herein to further describe certain aspects and various embodiments of the present invention. It is to be understood, however, that a wide variety of alternate and/or equivalent embodiments or implementations calculated to achieve the same purposes may be substituted for the embodiments shown and described without departing from the scope of the present invention. Those with skill in the art will readily appreciate that embodiments in accordance with the present invention may be implemented in a very wide variety of ways. This application is intended to cover any adaptations or variations of the embodiments discussed herein.

We claim:

1. An adjustable pitch lumber unscrambler comprising:
   a first plurality of first chain pairs, each of the first chain pairs comprising a pair of parallel, continuous chains, a first plurality of first bar lugs mounted between the first chain pairs, a distance between the first bar lugs is a first fixed pitch, and the first bar lugs on different first chain pairs line up to each other;
   a second plurality of second chain pairs, each of the second chain pairs comprising a pair of parallel, continuous chains, a second plurality of second bar lugs mounted between the second chain pairs, a distance between the second bar lugs is a second fixed pitch, and the second bar lugs on different second chain pairs line up with each other;
   the first chain pairs and the second chain pairs being inter dispersed;
   at least one motor connected to a plurality of first sprockets driving the plurality of first chain pairs and connected to a plurality of second sprockets driving the plurality of second chain pairs so that the plurality of first sprockets can be driven independently of the plurality of second sprockets;
   a programmable controller configured to control the at least one motor to provide an adjustable pitch between the first bar lugs and the second bar lugs;
   a first lug location device in communication with the programmable controller configured to determine the location of the first bar lugs during use; and
   a second lug location device in communication with the programmable controller configured to determine the location of the second bar lugs during use.

2. The adjustable pitch lumber unscrambler according to claim 1, wherein the at least one motor comprising a first motor connected to the plurality of first sprockets driving the plurality of the first chain pairs, a second motor connected to the plurality of second sprockets driving the plurality of the second chain pairs, and the programmable controller is configured to control the first motor independent of the second motor to provide an adjustable pitch between the first bar lugs and the second bar lugs.

3. The adjustable pitch lumber unscrambler according to claim 2, wherein the first lug location device comprises an encoder associated with the first motor the second lug location device comprises an encoder associated with the second motor.

4. The adjustable pitch lumber unscrambler according to claim 1, further comprising a clutch switchable between engaging the second bar lugs with the at least one motor and disengaging the second bar lugs with the at least one motor, when the clutch engages the second bar lugs, the first and second bar lugs are driven in unison by the at least one motor, and when the clutch disengages the second bar lugs, the first bar lugs are driven by the at least one motor independently of the second bar lugs so that the adjustable pitch can be adjusted as desired, and the clutch is connected to the programmable controller.

5. The adjustable pitch lumber unscrambler according to claim 1, wherein a first side of the first bar lug is welded to a link of a first chain in the first chain pair and a second side of the first bar lug is welded to a link of a second chain in the first chain pair.

6. The adjustable pitch lumber unscrambler according to claim 1, wherein a first side of the second bar lug is welded to a link of a first chain in the second chain pair and a second side of the second bar lug is welded to a link of a second chain in the second chain pair.

7. The adjustable pitch lumber unscrambler according to claim 1, wherein the first fixed pitch is substantially the same as the second fixed pitch.

8. A method of unscrambling lumber comprising:
   providing an adjustable pitch lumber unscrambler comprising:
      a first plurality of first chain pairs, each of the first chain pairs comprising a pair of parallel, continuous chains, a first plurality of first bar lugs mounted between the first chain pairs, a distance between the first bar lugs is a first fixed pitch, and the first bar lugs on different first chain pairs line up to each other;
      a second plurality of second chain pairs, each of the second chain pairs comprising a pair of parallel, continuous chains, a second plurality of second bar lugs mounted between the second chain pairs, a distance between the second bar lugs is a second fixed pitch, and the second bar lugs on different second chain pairs line up with each other;
      the first chain pairs and the second chain pairs being inter dispersed;
      at least one motor connected to a plurality of first sprockets driving the plurality of first chain pairs and connected to a plurality of second sprockets driving the plurality of second chain pairs so that the plurality of first sprockets can be driven independently of the plurality of second sprockets;

a programmable controller configured to control the at least one motor to provide an adjustable pitch between the first bar lugs and the second bar lugs;

a first lug location device in communication with the programmable controller configured to determine the location of the first bar lugs during use; and a second lug location device in communication with the programmable controller configured to determine the location of the second bar lugs during use;

adjusting the adjustable pitch by moving the plurality of first chain pairs in relation to the second chain pairs to form slots between adjacent first and second bar lugs, the slot being sized to receive only one piece of lumber;

feeding the lumber to a bottom of the unscrambler; and moving the plurality of first chain pairs and plurality of second bar lug chains in unison by the at least one motor so that a single piece of lumber falls in each slot and the lumber is carried up to a top of the unscrambler by the moving first chain pairs and plurality of second bar lug chains.

9. The method according to claim 8, wherein the at least one motor comprising a first motor connected to the plurality of first sprockets driving the plurality of the first chain pairs, a second motor connected to the plurality of second sprockets driving the plurality of the second chain pairs, and the programmable controller is configured to control the first motor independent of the second motor to provide an adjustable pitch between the first bar lugs and the second bar lugs.

10. The method according to claim 9, wherein the first lug location device comprises an encoder associated with the first motor the second lug location device comprises an encoder associated with the second motor.

11. The method according to claim 8, further comprising a clutch switchable between engaging the second bar lugs with the at least one motor and disengaging the second bar lugs with the at least one motor, the method further comprising the programmable controller disengaging the clutch and the at least one motor driving the first bar lugs independently of the second bar lugs to adjust the adjustable pitch;

and the programmable controller engaging the clutch and the at least one motor driving the first and second bar lugs in unison.

12. The method according to claim 8, wherein a first side of the first bar lug is welded to a link of a first chain in the chain pair and a second side of the second bar lug is welded to a link of a second chain in the chain pair.

13. The method according to claim 8, wherein the first plurality of first chain pairs are inter dispersed with the second plurality of second chain pairs.

14. The method according to claim 8, wherein the first fixed pitch is substantially the same as the second fixed pitch.

15. The method according to claim 8, wherein the lumber has the same width and thickness and is unscrambled in a planer mill process.

16. An adjustable pitch lumber unscrambler comprising:
a first plurality of first chain pairs, each of the first chain pairs comprising a pair of parallel, continuous chains, a first plurality of first lugs mounted on the first chain pairs, a distance between the first lugs is a first fixed pitch, and the first lugs on different first chain pairs line up to each other;

a second plurality of second chain pairs, each of the second chain pairs comprising a pair of parallel, continuous chains, a second plurality of second lugs mounted on the second chain pairs, a distance between the second lugs is a second fixed pitch, and the second lugs on different second chain pairs line up with each other;

the first chain pairs and the second chain pairs being inter dispersed;

at least one motor connected to a plurality of first sprockets driving the plurality of first chain pairs and connected to a plurality of second sprockets driving the plurality of second chain pairs so that the plurality of first sprockets can be driven independently of the plurality of second sprockets;

a programmable controller configured to control the at least one motor to provide an adjustable pitch between the first lugs and the second lugs;

a first lug location device in communication with the programmable controller configured to determine the location of the first lugs during use; and a second lug location device in communication with the programmable controller configured to determine the location of the second lugs during use.

17. The adjustable pitch lumber unscrambler according to claim 16, wherein the at least one motor comprising a first motor connected to the plurality of first sprockets driving the plurality of the first chain pairs, a second motor connected to the plurality of second sprockets driving the plurality of the second chain pairs, and the programmable controller is configured to control the first motor independent of the second motor to provide an adjustable pitch between the first lugs and the second lugs.

18. The adjustable pitch lumber unscrambler according to claim 17, wherein the first lug location device comprises an encoder associated with the first motor the second lug location device comprises an encoder associated with the second motor.

19. The adjustable pitch lumber unscrambler according to claim 16, further comprising a clutch switchable between engaging the second lugs with the at least one motor and disengaging the second lugs with the at least one motor, when the clutch engages the second lugs, the first and second lugs are driven in unison by the at least one motor, and when the clutch disengages the second lugs, the first lugs are driven by the at least one motor independently of the second lugs so that the adjustable pitch can be adjusted as desired, and the clutch is connected to the programmable controller.

20. The adjustable pitch lumber unscrambler according to claim 16, wherein the first fixed pitch is substantially the same as the second fixed pitch.

21. A method of unscrambling lumber comprising:
providing an adjustable pitch lumber unscrambler comprising:
a first plurality of first lug chain pairs, each of the first lug chain pairs comprising a pair of parallel, continuous chains, a first plurality of first lugs mounted on the chain pairs, a distance between the first lugs is a first fixed pitch, and the first lugs on different first lug chain pairs line up to each other;

a second plurality of second lug chain pairs, each of the second lug chain pairs comprising a pair of parallel, continuous chains, a second plurality of second lugs mounted on the chain pairs, a distance between the second lugs is a second fixed pitch, and the second lugs on different second lug chain pairs line up with each other;

the first lug chain pairs and the second lug chain pairs being inter dispersed;

at least one motor connected to a plurality of first sprockets driving the plurality of first chain pairs and connected to a plurality of second sprockets driving the plurality of second chain pairs so that the plurality of first sprockets can be driven independently of the plurality of second sprockets;

a programmable controller configured to control the at least one motor to provide an adjustable pitch between the first lugs and the second lugs;

a first lug location device in communication with the programmable controller configured to determine the location of the first lugs during use; and a second lug location device in communication with the programmable controller configured to determine the location of the second lugs during use;

adjusting the adjustable pitch by moving the plurality of first lug chain pairs in relation to the second lug chain pairs to form slots between adjacent first and second lugs, the slot being sized to receive only one piece of lumber;

feeding the lumber to a bottom of the unscrambler; and moving the plurality of first lug chain pairs and plurality of second lug chains in unison by the at least one motor so that a single piece of lumber falls in each slot and the lumber is carried up to a top of the unscrambler by the moving first lug chain pairs and plurality of second lug chains.

22. The method according to claim 21, wherein the at least one motor comprising a first motor connected to the plurality of first sprockets driving the plurality of the first chain pairs, a second motor connected to the plurality of second sprockets driving the plurality of the second chain pairs, and the programmable controller is configured to control the first motor independent of the second motor to provide an adjustable pitch between the first lugs and the second lugs.

23. The method according to claim 22, wherein the first lug location device comprises an encoder associated with the first motor the second lug location device comprises an encoder associated with the second motor.

24. The method according to claim 22, further comprising a clutch switchable between engaging the second lugs with the at least one motor and disengaging the second lugs with the at least one motor, the method further comprising the programmable controller disengaging the clutch and the at least one motor driving the first lugs independently of the second lugs to adjust the adjustable pitch; and the programmable controller engaging the clutch and the at least one motor driving the first and second lugs in unison.

25. The method according to claim 22, wherein the first plurality of first lug chain pairs are inter dispersed with the second plurality of second lug chain pairs.

26. The method according to claim 22, wherein the first fixed pitch is substantially the same as the second fixed pitch.

27. The method according to claim 22, wherein the lumber has the same width and thickness and is unscrambled in a planer mill process.

* * * * *